United States Patent [19]

Provost et al.

[11] Patent Number: 4,642,900
[45] Date of Patent: Feb. 17, 1987

[54] SHIM SELECTOR

[75] Inventors: Lawrence A. Provost, Warren; Robert D. Boyer, Ferndale, both of Mich.

[73] Assignee: Kent-Moore Corporation, Warren, Mich.

[21] Appl. No.: 752,520

[22] Filed: Jul. 8, 1985

[51] Int. Cl.[4] ............................................. G01B 5/18
[52] U.S. Cl. ........................... 33/169 B; 33/180 AT; 33/181 AT
[58] Field of Search ........ 33/169 B, 180 AT, 181 AT

[56] References Cited

U.S. PATENT DOCUMENTS

| 1,439,321 | 12/1922 | Page | 33/169 B |
|---|---|---|---|
| 2,807,882 | 10/1957 | Lovenston | 33/169 B |
| 3,447,245 | 6/1969 | Holdridge | 33/169 B |

OTHER PUBLICATIONS

"A Drill Jig for Round Work"-by A. P. Gwiazdowski *American Machinist;* vol 70, No. 15, Apr. 11, 1929, p. 605.

*Primary Examiner*—Willis Little
*Attorney, Agent, or Firm*—Barnes, Kisselle, Raisch, Choate, Whittemore & Hulbert

[57] ABSTRACT

A device for selecting shims to take up the end play of bearings in an automotive power train such as the bearings in the transaxle. The shim selector assembly consists of a bridge with supporting legs, a gauging cylinder and a gauge plunger telescoped in the gauging cylinder. The bridge is placed on the mating surface of the cover of the transaxle housing and the gauging cylinder projected into and bottomed on the face of the bore in the housing cover for the bearing. The gauging cylinder is fixed in place with a set screw. The gauge plunger is now telescoped in the gauge cylinder. Thereafter the bridge and gauging cylinder assembly is inverted and with the legs resting on the mating face of the housing, the gauge plunger is brought into contact with the face of the bearing being measured for end play. The gap between the upper end of the gauge plunger and the lower end of the gauging cylinder measures the thickness of the shim which is of the proper thickness to take up the end play in the bearing.

7 Claims, 5 Drawing Figures

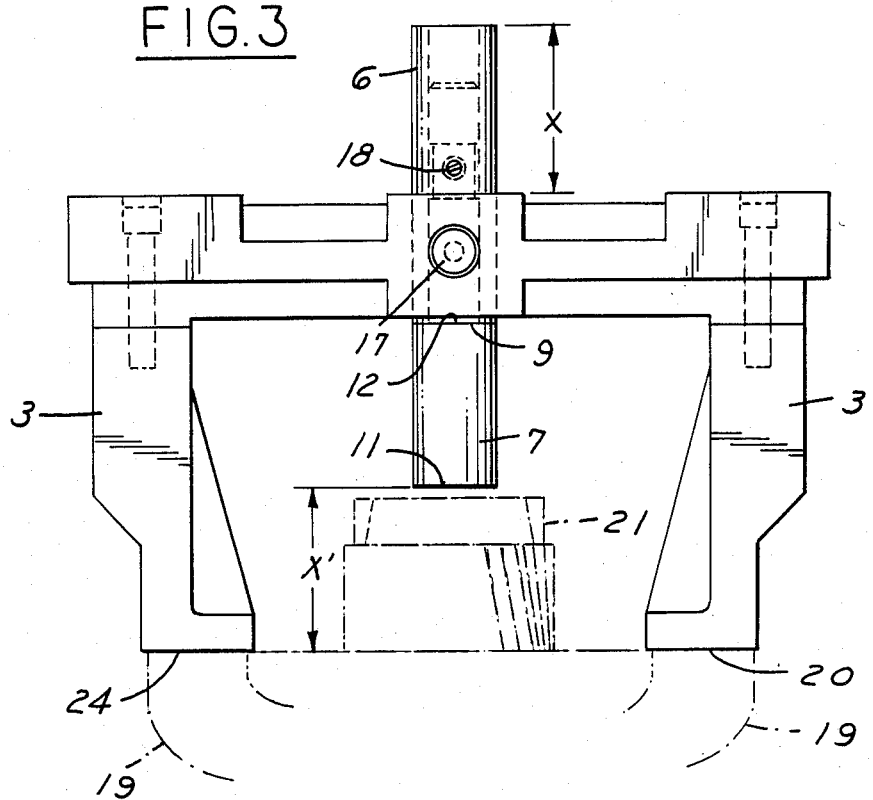
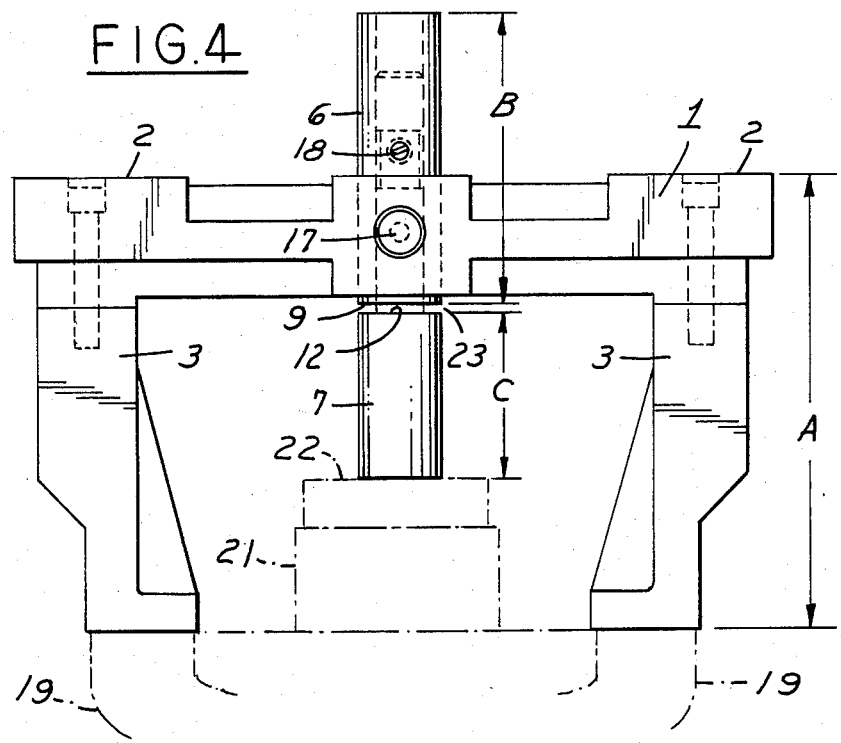

SHIM SELECTOR

This invention relates to a shim selector.

BACKGROUND AND SUMMARY OF THE INVENTION

In an automotive vehicle the power from the internal combustion engine is transmitted to the driving wheels of the vehicle through a power train that encompasses a variable speed transmission and differential which may be assembled into one housing. This portion of the power train is then identified as a transaxle. During the manufacture of a transaxle the bearings are selectively shimmed to accomodate the numerous manufacturing tolerances of the shafts, gears, housing, and bearings. In use one or more of these parts may fail necessitating the replacement of said part. During overhaul of the transaxle, the shims must be adjusted to allow for new variations of the replacement parts. Since the gears of the automotive transaxle, for example, are enclosed in a housing, the end play of the bearings, of necessity, is measured with the cover of the transaxle housing removed. Such measurement of the end play of the bearings in the components of the power train has been achieved by the utilization of a series of telescopic gauges each comprising an outer sleeve and a base pad in telescopic relation therewith specifically designed or dimensioned to measure the end play of the various bearings involved, for example, in the transaxle, and these gauges are used in conjunction with a series of spacers of equal length which are positioned evenly around and between the transaxle case and the cover plate to hold the cover in a predetermined position with respect to the case while the gauges are in place for measuring the end play. The length of the spacer is such that when the cover is placed on the case and the three gauges are placed on their respective bearings, each gauge would be fully collapsed if there was no end play in the bearing when the cover was placed on the case. When the gauge is fully collapsed the over all length of the gauge is the same as that of the spacer. Since there is end play in the bearing when the cover is placed on the case, then a gap will appear between the gauge outer sleeve and the base pad. This gap is the measure of the thickness of the shim that should be used to take up end play.

This prior device for selecting shims of the proper thickness to take up end play is complicated because it requires a separate gauge for each of the different bearings being measured for end play, for example, such as the input, the output, and the differential bearings in a transaxle as well as a plurality of spacers which must be accurately located between the case and the cover and are designed to hold the transaxle case and its respective cover in a predetermined spaced relation while the gauges are in place for measuring the end play.

This invention contemplates a shim selecting device comprising a bridge with supporting legs, the bridge having a central opening which receives a gauge in the form of a cylindrical sleeve. A gauging plunger or base pad, one end of which is reduced in size and inserted or telescoped in the cylindrical gauge or sleeve completes the assembly. The combined length of the gauging cylinder and gauge plunger or base pad is equal to the height of the bridge assembly from the bottom face of the legs to the top face of the bridge. The bridge is placed with its gauging surface on the mating surface of the transaxle cover and the gauge cylinder is moved into and seated on the bottom surface of the bore on which the bearing whose end play is being corrected is seated. The gauging cylinder is fixed in place by a set screw. The gauge plunger is now telescoped in the gauge cylinder. The bridge assembly is now inverted and placed with its legs on the mating surface of the transaxle housing and the gauge plunger or base pad placed in contact with the end of the bearing whose end play is being measured. The gauge plunger is now fixed in place preferably with a set screw and the gap between the adjacent ends of the gauging cylinder and gauging plunger determines the thickness of the shim necessary to take up the end play of the bearing.

The shim selector is simple in structure comprising a minimum of parts, easy to operate and accurately measures or indicates the end play or wear of the bearings in the power train transaxle.

DESCRIPTION OF THE DRAWINGS

FIG. 3 shows the shim selector in position for gauging the upper end of a transaxle bearing.

FIG. 4 shows the gauge plunger in contact with the face of the bearing and the gap between the mating surfaces of the gauging cylinder and the gauge plunger or base pad indicating the end play of the bearing and the size of the shim to be selected.

DESCRIPTION

Figure 1:
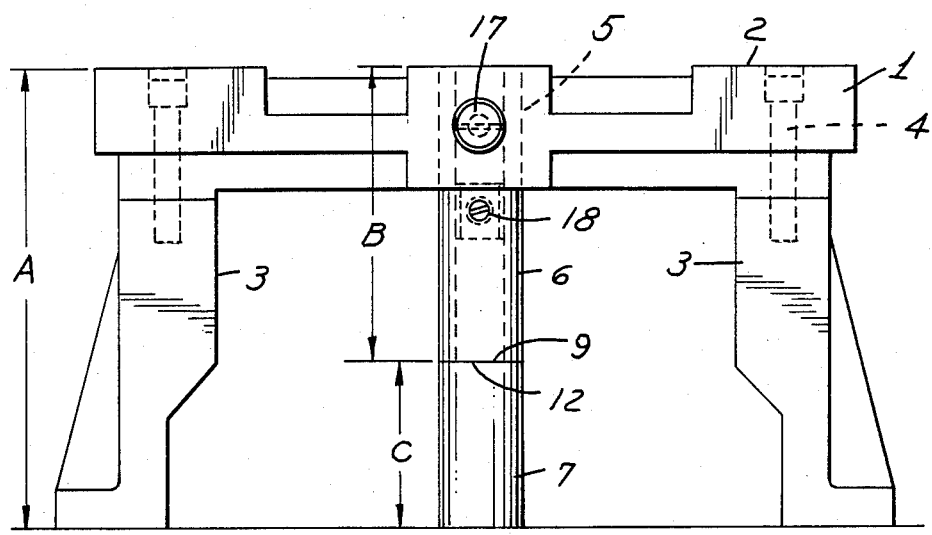
FIG. 1 is a side elevetion showing the shim selector.

Referring more particularly to the drawings there is shown a bridge 1 having an accurate planar top face 2 and a pair of legs 3 connected thereto by the bolts 4 for supporting the bridge 3. With the bolts 4 loosened the legs 1 can be rotated into the position shown in FIG. 2 or rotated 180° to the position shown in FIG. 3, or any intermediate position.

The bridge is provided with a bore 5 in which is slidably mounted the gauging cylinder 6. Bore 5 can be located anywhere between the legs 3 but preferably is located centrally of the bridge 1. A gauge plunger 7 or base pad is provided with a reduced end 8 which is telescoped within the gauging cylinder sleeve 6. The gauging cylinder is provided with end faces 9 and 10. The gauging plunger is provided with end faces 11 and 12. Faces 9, 10, 11 and 12 are accurately machined planar faces perpendicular to the longitudinal axes of the gauging cylinder 6 and gauge plunger 7. The overall length of the gauging cylinder 6 is designated by the letter B. The overall length of the gauging plunger 7 is designated by the letter C. The length of gauge plunger 7 does not include the length of reduced end 8 which serves no gauging or measuring function but only serves to telescopically connect plunger 7 and cylinder 6 during use of the shim selector. The bridge 1 when combined with the legs 3 is herein called the "bridge assembly". The height of the bridge assembly is designated A. A=B+C. These dimensions are shown in FIGS. 1 and 4.

Figure 2:
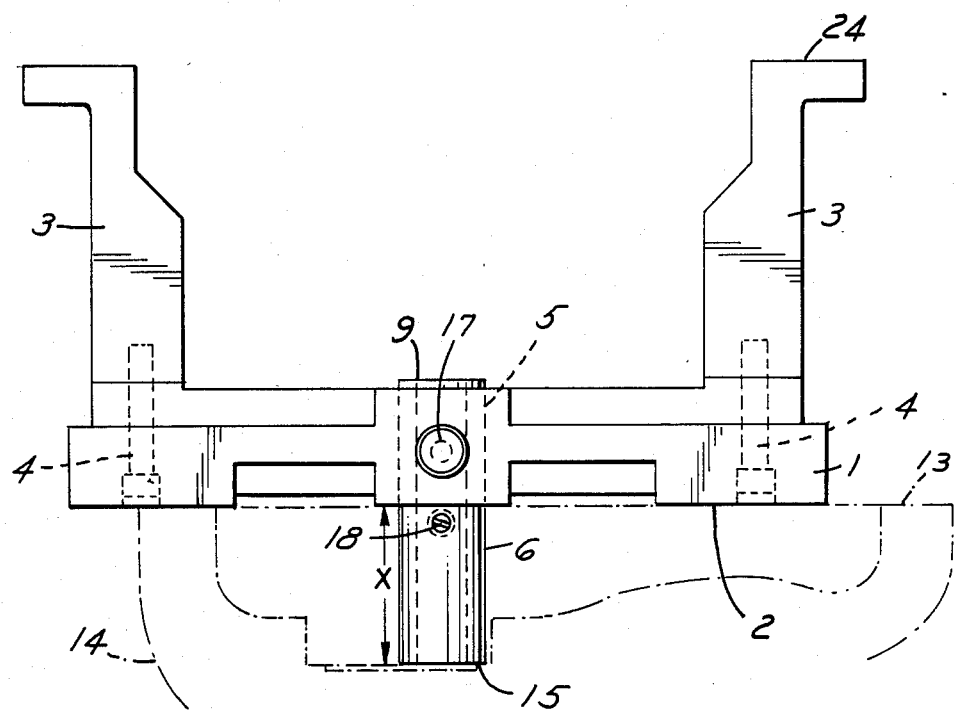
FIG. 2 is a side elevation showing the shim selector assembly measuring the depth of the bore for one of the bearings whose end play is being measured but with the shim selector assembly inverted from the position shown in FIG. 1.
Figure 6:
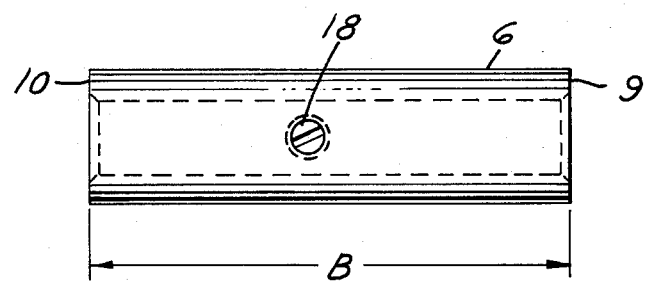
FIG. 6 is a side elevation showing the gauging cylinder or sleeve.
Figure 5:
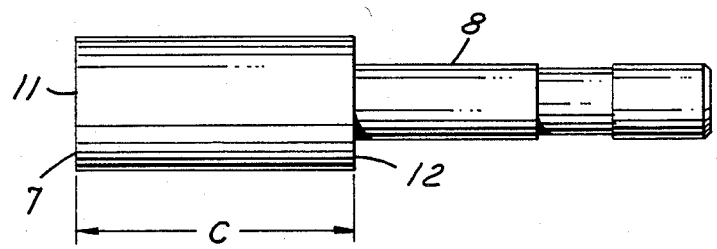
FIG. 5 is a side elevation showing the gauge plunger or base pad.

When the shim selector is used for detecting the end play in a bearing, for example, in an automotive transaxle, the bridge is placed against the mating face 13 of the transaxle cover 14. At this time the cover and bridge can be positioned as shown in FIG. 2 with the bridge resting with planar face 2 upon the cover 14 so that the gauge cylinder 6 will drop down into contact with the base 15 of the bore in the transaxle cover 14 on which the bearing of the transaxle is designed to seat. After the gauging cylinder 6 is seated on the surface 15 it is locked in place by the thumb screw 17, FIG. 2. The distance X, FIG. 2, is the distance the bearing 21 will project into the bore in the cover 14 and seat against the face 15 if there is no bearing end play.

The reduced end 8 of gauging plunger 7 is now inserted into the gauging cylinder 6 until the end face 12 of the gauging plunger bottoms against the face 9 of the gauging cylinder and temporarily locked in place by the knurled thumb screw 18, FIG. 3. The bridge assembly with the gauge cylinder 6 locked in place with set screw 17 and the gauging plunger locked in place by screw 18 is now inverted, as shown in FIG. 3, and placed on the transaxle case 19 with the lower planar faces 24 of the legs 3 against the mating surface 20 of the transaxle case against which the mating face 13 of the cover 14 rests when the transaxle case and cover are assembled. Planar faces 24 of legs 3 are parallel to face 2 of bridge 1. The transaxle bearing being measured for end play is designated 21. The thumb screw 18 is released and the gauging plunger is allowed to come to rest on the upper surface 22 of the transaxle bearing, FIG. 4. The thumb screw 18 is now turned to lock the gauging plunger 7 in place. The gap between the lower face 9 of cylinder 6 and the upper face 12 of the plunger 7 indicates the amount of end play of the bearing. The gap is designated 23 in FIG. 4. When the shim selector is positioned, as shown in FIG. 3, with the face 9 of the gauging cylinder 6 in contact with the upper face 12 of the base pad or plunger 7 and with the legs 3 resting against the mating surface 20 of the transaxle case, the distance X' between the lower end 11 of the gauge plunger or base pad 7 and the mating face 20 of the transaxle housing 19 is equal to the distance X. X is the depth of the bore in the cover 14. Since the combined lengths of the gauging cylinder 6 and gauging plunger 7 is equal to the height A of the bridge assembly, if there is end play in the bearing being measured, then when the gauging cylinder 7 is brought into contact with the upper end of the bearing 21, FIG. 4, there will be a gap 23 between the face 12 of the gauging plunger and the lower face 9 of the gauging cylinder. This gap measures the end play or wear of the bearing 21 which is to be taken up by inserting a shim between the face of the bearing and the mating face 15 of the bore in the cover 14. This gap 23 between the gauging cylinder 6 and the shoulder of the gauging plunger 7 can be measured by a feeler gauge to give the proper thickness of the shim to correct the end play of the bearing. Using the feeler gauge measurement a thrust washer or shim chart can be provided to select the correct shim thickness to give the proper bearing end play. Instead of using a feeler gauge one can insert shims in the gap 23 until the shim of the required thickness to take up the end play has been chosen. The largest shim that can be drawn through gap 23 without binding is the correct shim which should be used for taking up the end play of the bearing.

When it is desired to have the bearing under compression or load in which case the combined lengths B and C of the gauge cylinder 6 and plunger 7 respectively, will be typically 8 to 12 thousandths of an inch less than the dimension A of FIG. 4. In this case when the measurements are taken the gap 23 between the surfaces 12 and 9 will be slightly wider than indicated at 23 thereby providing for a slightly thicker shim which when inserted in place will place the bearing under compression or load. If it is desired to have a small amount of bearing end play, then the combined lengths B and C of the gauge cylinder 6 and plunger 7 will be typically 10 to 20 thousands of an inch more than the dimension A.

We claim:

1. A shim selector device for selecting shims to take up the end play of bearings in a housing comprising
   a bridge,
   a plurality of legs for supporting the bridge,
   said bridge having a planar upper surface and planar lower surface defined by the lower surfaces of the legs, said upper and lower surfaces of the bridge being parallel,
   said bridge having an opening therethrough,
   a guage adjustable as to length mounted in the opening of the bridge, the overall minimum length of the gauge being equal to the height of the bridge and leg assembly,
   said guage comprising a cylindrical sleeve adjustably mounted in said opening of said bridge and a gauging plunger having a reduced end telescoped within said cylindrical sleeve and having a free end,
   said sleeve and gauging plunger being movable axially relative to one another to define a gap between the lower face of the gauging sleeve and the upper face of the gauging plunger,
   said sleeve having a longitudinal axis and upper and lower ends, said surfaces being planar and parallel, said surface being perpendicular to the longitudinal axis of said sleeve,
   the free end of said gauging plunger being planar and perpendicular to the longitudinal axis of said gauging plunger,
   means for locking said sleeve in adjusted position on said bridge,
   means for locking said plunger in adjusted position on said sleeve,
   said upper surface of said bridge being unobstructed such that the bridge can be initially placed with said lower surface in contact with one section of a housing to detect end play in a bearing with the sleeve free to move so that the sleeve will drop into contact with the base of a bore in the one section, the sleeve can then be locked in position relative to the bridge by actuating the means for locking the sleeve, the lower surface of the bridge being unobstructed so that the gauging plunger can be inserted and temporarily locked in position, the bridge can then be inverted to bring the second surface into contact with a surface of the other mating section of said housing, the means for locking the gauging plunger released permitting the gauging cylinder to rest on the upper surface of a bearing in the other section of the housing thereby forming a gap between the lower face of the sleeve and the upper face of the gauging plunger, which gap indicates the amount of play of the bearing which can be measured for determining the size of the shim.

2. The combination set forth in claim 1 wherein the overall minimum length of the gauge is equal to the distance between the upper surface of the bridge and the lower surface of the legs.

3. The shim selector set forth in claim 1 including means interconnecting said legs and said bridge such that the free ends of said legs can be adjusted to span different distances.

4. The shim seleector device set forth in claim 1 wherein the overall length of the gauge when the lower end of the sleeve is in abutting relation with the upper end of the gauging plunger being equal to the height of the bridge assembly measured from the planar lower faces of the legs to the upper planar surface of the bridge.

5. The combination as set forth in claim 1 whereby the depth of the bore is measured by resting the bridge with its planar face upon the mating face of the cover of a housing for the bearing with the legs extending upwardly from the bridge and the sleeve of the gauge is lowered into contact with the bottom of the bore in the housing cover upon which the bearing is designed to seat and fixed in place whereupon the bridge assembly is inverted and place of:the case of the bearing housing with the lower planar faces of the legs against the mating surfaces of the case against which the mating face of the cover rests when the case and cover are assembled and the gauging plunger is lowered into contact with the bearing and the gap between the sleeve and gauging plunger indicates the thickness of the shim for taking up end play of the bearing.

6. The shim selector device set forth in claim 1 wherein said sleeve has a length B and said gauging plunger has a length C, the overall length B+C of the gauge when the lower end of the sleeve is in abutting relation with the upper end of the gauging plunger being typically 8 to 12 thousandths of an inch less than the height A of the bridge assembly measured from the planar lower faces of the legs to the upper planar surface of the bridge.

7. A shim selector device as set forth in claim 1 wherein said sleeve has a length B and the lower member has a length C, the overall length of the gauge B+C when the lower end of the upper member is in abutting relation with the upper end of the lower member being typically 10 to 20 thousandths of an inch more than the height A of the bridge assembly measured from the planar lower faces of the legs of the upper planar surface of the bridge.

* * * * *